United States Patent

[11] 3,600,081

[72] Inventor Raymond K. Egnaczak
  Williamson, N.Y.
[21] Appl. No. 876,642
[22] Filed Nov. 14, 1969
[45] Patented Aug. 17, 1971
[73] Assignee Xerox Corporation
  Rochester, N.Y.

[54] IMAGING APPARATUS
  15 Claims, 3 Drawing Figs.
[52] U.S. Cl. .................................................. 355/3,
  355/8, 355/15, 355/4
[51] Int. Cl. .......................................... G03g 15/00
[50] Field of Search .......................................... 355/3, 8,
  17, 18, 50, 51, 47, 48, 49; 96/1

[56] References Cited
UNITED STATES PATENTS
3,485,738 12/1969 Carreira .................... 204/181
3,399,611 9/1968 Lusher ...................... 355/8

Primary Examiner—Samuel S. Matthews
Assistant Examiner—D. J. Clement
Attorneys—James J. Ralabate, David C. Petre and Barry Jay Kesselman ABSTRACT: A machine for automatically producing images from photoelectrophoretic suspensions including a cylindrical transparent electrode which produces images by a slit scanning optical system internal to the cylindrical electrode and accomplishes processing by an arrangement having a plurality of imaging electrodes and a transfer electrode mechanism interface with the surface of the cylindrical transparent electrode at a single position where the scanning optical image is projected. The imaging electrodes are supplied with suspension or solvent, as is required by the process, prior to their interfacing with the cylindrical transparent electrode and a sheet of support material is interjected on the transfer electrode prior its interfacing with the cylindrical electrode. Each of the interfacing electrodes are cleaned before reinterfacing and the transparent cylindrical electrode is cleaned after interaction with the transfer electrode.

PATENTED AUG 17 1971

INVENTOR.
RAYMOND K. EGNACZAK

BY Barry Jay Kesselman
ATTORNEY

IMAGING APPARATUS

This invention relates to imaging machines and more particularly to machines employing photoelectrophoretic imaging techniques.

Since the new invention of photoelectrophoresis was disclosed for forming black and white or full color images various machine embodiments have been envisioned to accommodate this imaging technique in an automated machine environment. The basic inventions are described in U.S. Pat. Nos. 3,384,488; 3,384,565; 3,384,566 and 3,383,993 all issued on May 21, 1968. They disclose how to produce a visual image at one or both of two electrodes between which photoelectrophoretic particle suspensions are placed. The particles are photosensitive and appear to undergo a net change in charge polarity or a polarity alteration by interaction with one of the electrodes upon exposure to activating electromagnetic radiation. No other photosensitive elements or materials are required hence, this provides a very simple and inexpensive imaging technique. Mixtures of two or more differently colored particles can secure various colors of images. Particles in these mixes may have overlapping or separate spectral response curves and are usable in subtractive color synthesis. The particles will migrate from one of the electrodes under the influence of an electric field when struck with energy of a wavelength within the spectral response of the colored particles.

A continuous imaging machine was disclosed in U.S. Pat. No. 3,427,242 issued Feb. 11, 1969 which depicts apparatus for forming continuous images from photoelectrophoretic imaging suspensions by projection of an original utilizing a system for scanning an object and passing the image rays twice through the transparent surface of a cylindrical electrode. Each of the processing components shown in this patent interface with the transparent electrode at various positions around its circumference requiring a large machine environment and various engineering precision adjustments at different positions of the machine. In order to benefit from imagewise illumination at the various processing stations, beam splitters or other optical equipment would be required.

Therefore, it is an object of this invention to overcome the above-noted problems. Another object of this invention is to improve apparatus for automatically producing images. Still another object of this invention is to employ photoelectrophoretic techniques of imaging to improve automated repetitive imaging forming machines. Another object of this invention is to perform all photoelectrophoretic imaging steps at one location.

These and other objects of this invention are accomplished by the use of a transparent cylindrical image carrying electrode member that rotates past a single interface position for interaction with components utilized for automated image formation. Photosensitive material is supplied between a first imaging electrode and the cylindrical electrode at the interface position between the two where a flowing radiation image is projected. A second imaging electrode interacts with the cylindrical electrode at the same position under the same imaging conditions and a transfer electrode with a sheet of support material placed thereon functions with the cylindrical electrode at the same position for removing the image on the cylindrical electrode which will form the final image. A cleaning mechanism for the cylindrical electrode removes residual imaging material therefrom and the process steps are repeated.

The invention herein is described and illustrated in a specific embodiment having specific components listed for carrying out the functions of the apparatus. Nevertheless, the invention need not be thought of as being confined to such a specific showing and should be construed broadly within the scope of the claims. Any and all equivalent structures known to those skilled in the art can be substituted for specific apparatus disclosed as long as the substituted apparatus achieves a similar function. It may be that other processes or apparatus will be invented having similar needs to those fulfilled by the apparatus described and claimed herein and it is the intention herein to describe an invention for use in apparatus other than the embodiment shown.

These and other objects and advantages will become apparent to those skilled in the art after reading the following description taken in conjunction with the accompanying drawings wherein:

FIG. 1 schematically illustrates an embodiment of a machine for forming photoelectrophoretic images in accordance with the invention herein;

Figure 1:
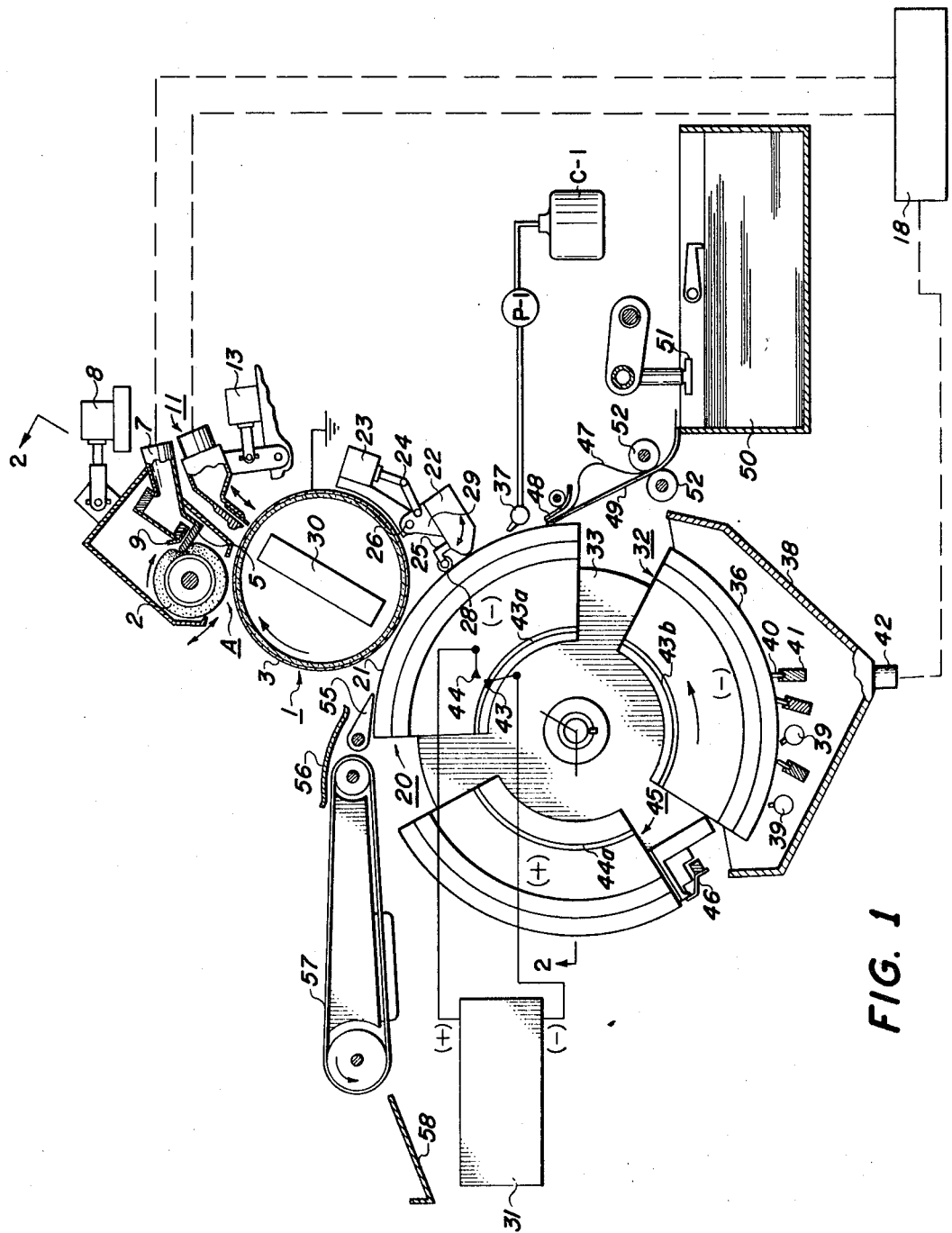

A detailed description of the operation and theories relating to the actual imaging system automated by this invention and discussing the interaction of the photoelectrophoretic particles in the suspension used for image formation is found in the above cited patents. The imaging system therein described and which can be employed in the apparatus described herein operates by producing electromagnetic radiation in image configuration to which the individual photoelectrophoretic particles within the suspension are sensitive. The activating radiation and an electric field across the imaging suspension combine between two electrodes in the imaging area. An electrode referred to as the "transparent injecting electrode" is maintained electrically positive relative to "imaging electrodes" interfacing with it at the imaging area across the photosensitive suspension. Therefore, particles within the suspension that are negatively charged will be attracted to the relatively positive, transparent injecting electrode.

The "injecting electrode" is so named because it is thought to inject electrical charges into activated photosensitive particles during imaging. The term "photosensitive" for the purposes of this invention refers to the property of a particle which, once attracted to the injecting electrode, will alter its polarity and migrate away from the electrode under the influence of an applied electric field when exposed to activating electromagnetic radiation. The term "suspension" may be defined as a system having solid particles dispersed in a solid, liquid or gas. Nevertheless, the suspension used in the embodiment of this invention described herein is of the general type having a solid suspended in a liquid carrier. The term "imaging electrode" is used to describe that electrode which interfaces with the injecting electrode through the suspension and which once contacted by activated photosensitive particles will not inject sufficient charge into them to cause them to migrate from the imaging electrode surface. The "imaging zone" or "imaging area" is that zone between two electrodes where photoelectrophoretic imaging occurs.

The particles within the suspension are generally insulating when not struck by activating radiation within their spectral response curve. The negative particles come into contact with or are closely adjacent to the injecting electrode and remain in that position under the influence of the applied electric field until they are exposed to activating electromagnetic radiation. The particles near the surface of the injecting electrode make up the potential imaging particles for the final image to be reproduced thereon. When activating radiation strikes the particles, it makes them conductive "creating" an electrical junction of charge carriers which may be considered mobile in nature. The negative charge carriers of the electrical junction orient themselves toward the positive injecting electrode while the positive charge carriers move toward the imaging electrode. The negative charge carriers near the particle-electrode interface at the injecting electrode can move across the short distance between the particle and the surface of the electrode leaving the particle with a net positive charge. These polarity altered, net positively charged particles are now repelled away from the positive surface of the injecting electrode and are attracted to the negative surface of the imaging electrode. Accordingly, the particles struck by activating radiation of a wavelength with which they are sensitive, i.e., a wavelength which will cause the formation of an electrical junction within the particles, move away from the injecting electrode to the imaging electrode leaving behind only particles which are not exposed to sufficient electromagnetic radiation in their responsive range to undergo this change.

Consequently, if all the particles in the system are sensitive to one wavelength of light or another and the system is exposed to an image with that wavelength of light, a positive image will be formed on the surface of the injecting electrode by the subtraction of bound particles from its surface leaving behind particles in the unexposed areas only. The polarities on the system can be reversed and imaging will occur. The system may be operated with dispersions of particles which initially take on a net positive charge or a net negative charge.

The imaging suspension may contain one, two, three or more different particles of various colors having various ranges of spectral response. In a monochromatic system the particles included in the suspension may be of any color and produce any color and the particle spectral response is relatively immaterial as long as there is a response in some region of the spectrum which can be matched by a convenient radiation exposure source. In polychromatic systems the particles may be selected so that particles of different colors respond to different wavelengths.

For photoelectrophoretic imaging to occur, these steps (not necessarily listed in the sequence that they occur) take place: (1) migration of the particles toward the injecting electrode due to the influence of the field, (2) the generation of charge carriers within the particles when struck with activating radiation, (3) particle deposition on or near the injecting electrode surface, (4) phenomena associated with the forming of an electrical junction between the particles and the injecting electrode, (5) particle charge exchange with the injecting electrode, (6) electrophoretic migration toward the imaging electrode, and (7) particle deposition on the imaging electrode. This leaves a positive image on the injecting electrode.

After the image is formed on the injecting electrode, the electrode may be brought into interface with a transfer member which has a charge polarity opposite to that of the imaging electrode. The injecting electrode is now maintained negative relative to the transfer member. The particles having a net negative charge will be attracted to the relatively positive transfer member. If a support material is interposed between the transfer member and the particle image, the particles will be attracted to the support material. Therefore, a photographically positive image can be formed on any support material.

FIG. 1 schematically illustrates an embodiment for automatically photoelectrophoretically imaging. At the first station, Station A, the surface of the injecting electrode 1 is cleaned of any residual materials or waste products from previous image formations. A preclean foam roller 2 rotates in contact with the surface 3 of the injecting electrode cylinder. It in turn is cleaned by a protruding bar 5 pinching the foam material of the roller 2. This action squeezes out liquids and solid materials suspended therein to be evacuated from the immediate vicinity of the foam roller protruding bar via a vacuum duct 7. A baffle arm 9 aids in collecting the materials squeezed out of the foam roller 2 for removal from the system. A "vacuum" as used herein refers to a negative pressure below atmospheric pressure but not necessarily a void. Likewise, "negative pressure" refers to a partially evacuated state of less than atmospheric pressure.

A wiper blade 10 contacts the surface 3 of the injecting electrode 1 to trap any liquid left on the surface 3 electrode after interaction with the foam cleaner roll 2. The vacuum squeegee 11, of which the wiper blade 10 is a part, removes the collected materials through the vacuum duct 12. The vacuum ducts 7 and 12 of the cleaning system attach to a pressure reducing means 18. Each of the subsystems are cyclically removable from the path of rotation of the injecting electrode cylinder 1. To this end, a solenoid 8 moves the housing in which the cleaning roller 2 is positioned and a solenoid 13 removes the vacuum squeegee 11. The solenoids are activated during the machine cycle after the transfer of the formed image to suitable support material so that the surface 3 can be cleaned. At other times the cleaning mechanism does not contact the surface or otherwise interfere with the image formed on the surface.

The cleaned injecting electrode surface 3 rotates in a synchronized manner with the projection of the original to be copied at the imaging area between the rotating surface 3 and an imaging electrode interfacing therewith. The first imaging electrode 20 has a surface 21 thereon formed of a blocking material which apparently functions to prevent sufficient charge injection into the particles of the imaging suspension to cause them to migrate away from its surface even if the particles are struck by electromagnetic radiation of a wavelength to which they are sensitive. Such materials may be Baryta paper or Tedlar, a polyvinyfluoride made E. I. duPont de Nemours and Company or any material functioning similarly to and in image formation. The imaging suspension is applied to the surface 21 of the first imaging electrode 20 via a suspension application means shown here to be an extruder 22. Of course, the suspension could be applied to the injecting electrode surface instead of the imaging electrode surface. The extruder 22 is moved into and out of operable interface with the surface 21 of the first imaging electrode 20 by a solenoid 23 connected through suitable linkage 24 to a bracket 25. This action pivots the extruder 22 about a pivot point 26 for the necessary movement. A smoothing rod 28 is attached by a bracket 29 to the extruder and functions to ensure that a smooth layer of imaging suspension is applied to the surface 21 for imaging at the interface between the injecting electrode 1 and the first imaging electrode 20.

While at the imaging area between the first imaging electrode 20 and the injecting electrode 1, the suspension and particles therein are subjected to activating radiation or illumination in image configuration provided by the image projection system. This image area encompasses all or part of the contact portion between the two electrodes as well as surrounding areas on either side where the suspension is in close proximity to the injecting electrode surface 3. In short, it includes any area or portion of an area in which photoelectrophoretic particle migration is likely to occur. The image light rays are projected to the image area via a projection system including the mirror 30 which is positioned within the injecting electrode cylinder 1. Simultaneously, an electric field is applied between the electrodes 1 and 20. This field can be between 300 v. and 5,000 v. per mil, for example, but need only be within a range to cause particle migration when the particle is struck by activating radiation. An electrical source 31 supplies the necessary electrical potential to each of the sectors interfacing with the injecting electrode 1.

A second imaging electrode 32 is mounted on the same cylindrical housing 33 with the first imaging electrode 20. The second imaging electrode functions to remove background particles from the image formed at the image area during the interaction of the injecting electrode 1 and the imaging electrode 20. For this reason, a liquid similar to the carrier of the suspension is applied to the surface 36 of the second imaging electrode 32 to carry away particles removed from the injecting electrode surface 3 which are not desirable for forming the final image. For this purpose a liquid carrier applicator 37 is positioned for intermittently depositing liquid carrier on the electrode sectors passing thereby. The applicator 37 is activated only when the second imaging electrode sector 32 passes in its vicinity. A pump P-1 forces liquid carrier through the applicator when it is needed in the process. Carrier is stored in a supply container C-1.

The surfaces of each of the sectors are cleaned in the sector cleaning tank 38 which as a series of cleaning fluid applicators 39. Squeegee or wiper blades 40 are held in brackets 41 to maintain them in a wiping contact relationship with the surfaces of the sectors passing thereby. The housing 38 is provided with a drain 43 for removal of the contaminated cleaning fluids. The removed fluid may be filtered and recirculated through the cleaning fluid spray applicators 39. The second imaging electrode sector 32 is connected to the electrical source 31 in the same manner as is the first imaging electrode 20 so that the same field exists between the injecting electrode surface 3 and the first and second imaging electrodes 20 and 32 when each passes through the imaging area. The connection is via brush contact 43 and the conductive connector strips 43a and 43b on the sectors 20 and 32 respectively. The connection to the power source 31 causes a field between the imaging electrodes and the grounded injecting electrode surface whereby the surface 3 is positive relative to the imaging electrodes. The brush contact 44 is connected by the conductive connector strip 44a to cause a field where the injecting electrode surface is negative relative to the transfer sector 45.

The third sector 45 connected to the cylindrical housing 33 is the transfer sector. This sector has an image support sheet gripper 46 at the lead edge of the sector for gripping a sheet. The sheet 47 is held in a ready position between the guide plates 48 and 49 for release into the gripper assembly 46 when the transfer sector 45 passes the guide plate 49. Individual sheets of support material are held in a stack 50 where they are singly removed by a vacuum removal source 51 and driven by pinch rollers 52 to the ready position between the guide plates 49 and 48. After the sheet is captured by the gripper mechanism 46 the sheet and transfer sector 45 are carried past the imaging area where the particles are removed from the surface 3 of the injecting electrode under a field the reverse of that of the two imaging electrodes 20 and 32 and optionally under image configuration illumination.

The sheet of support material is removed by a picker finger 55 which hooks inside the gripper mechanism 46. The gripper mechanism 46 is simultaneously released thereby having the picker finger 55 kick and guide the paper under the baffle plate 56 along a plate conveyor 57 to a copy sheet tray 58 where the sheet is stacked for removal from the mechanism.

The operation of the machine can be described in relation to the schematic illustration of FIG. 1. Assume at the start of the machine imaging cycle that the image area (that directly in line with the mirror 30) is between the gaps between the first imaging electrode sector 20 and the transfer electrode sector 45. When the machine cycle begins, suspension is supplied through the extruder 22 and smoothed by the smoothing rod 28 for passage at the image area between the surface 21 of the first imaging electrode and the surface 3 of the cleaned injecting electrode. When the interfacing of the injecting electrode with the first imaging electrode 20 is complete, the injecting electrode has rotated somewhat less than 360°. The greater portion of the surface of the injecting electrode is capable of maintaining an image although the cylinder can have no-image area of from 5° to 20° or more. The no-image area rotates into the gaps between the sectors.

The gap between the sectors allows for the removal of a bead of suspension which inherently builds up at the exit of the nip between the closely spaced or contacting electrode sectors and the injecting electrode surface. By having a break in the contact or interfacing between the electrodes the bead is prevented from being carried completely around the injecting electrode surface and interfering with the operation of the next sector at the imaging area.

The second imaging electrode sector 32 interfaces with the surface 3 at the same position as did the first imaging electrode 20. The electrode 32 has a layer of carrier applied to it by the carrier application member 37. The sector 32 remains interfaced with the surface 3 of the injecting electrode for an area approximately equal to the interface area of the first imaging electrode 20. Prior to 720° of revolution of the injecting electrode cylinder 1, the nip is again broken so that the bead of suspension and carrier is not forced completely around the injecting electrode surface 3.

After the image is formed on the injecting electrode surface 3, the transfer electrode sector 45 contacts the surface. The transfer electrode has a charge polarity opposite that of the imaging electrodes 20 and 32. Therefore, it is maintained positive relative to the injecting electrode 1. The particles of the image on the injecting electrode have a net negative charge and will be attracted toward the positive transfer electrode 45. The transfer electrode with a sheet of support material over its surface interfaces with the injecting electrode surface at approximately the same position on the surface 3 as the previous two imaging electrodes. The transfer electrode moves the image from the surface of the injecting electrode as the injecting electrode rotates to 1,080° from the start of the cycle. During this last 360° or so of rotation, the electrode cleaning mechanism at Station A contacts the surface 3 of the injecting electrode to remove residual particles and fluids therefrom. After the transfer, the housing 33 ceases to rotate at the gap between the transfer electrode sector 45 and the first imaging electrode sector 20. Simultaneously, the injecting electrode rotates past the cleaning mechanism at Station A to remove all of the particles and suspension left thereon.

During the passes of each of the sectored electrodes at the single position interface with the injecting electrode at the imaging area, an image is projected to the imaging area flowing synchronously with the moving surface 3 and the moving interfacing electrodes. In this manner the photoelectrophoretic imaging process is accomplished and transfer occurs under image illumination all automatically.

Figures 2, 3:
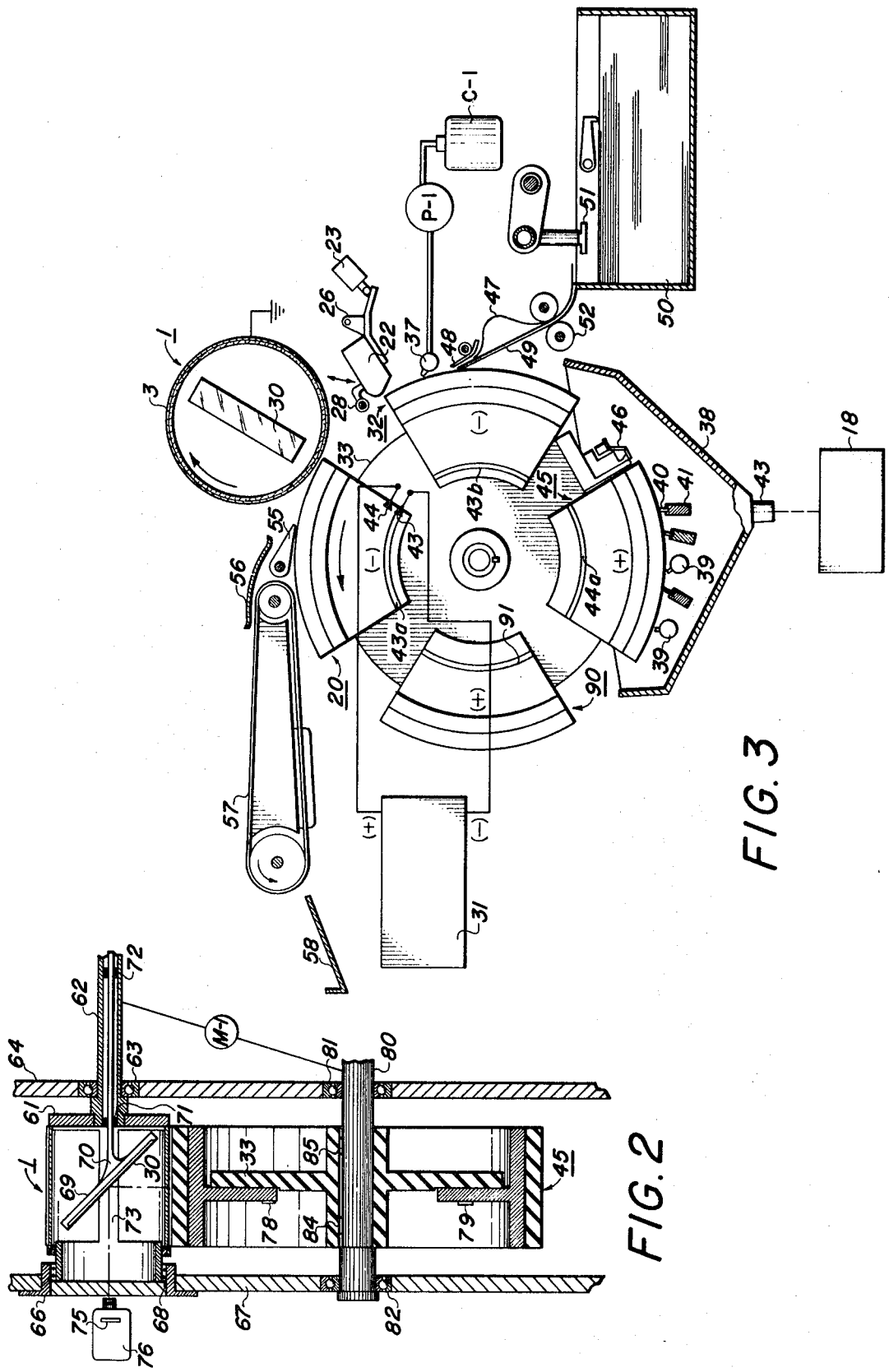
FIG. 2 is a sectional view of the drive system of the apparatus.
FIG. 3 is an alternative embodiment of the invention.

FIG. 2 is a side sectional view of a portion of the apparatus shown schematically in FIG. 1. Like reference numerals represent like parts in each of the drawings. The injecting electrode 1 has a transparent electrically conductive coating 3 over a transparent glass substrate. The injecting electrode structure can be NESA glass which is a tin oxide coated glass structure available from Pittsburgh Plate Glass Company. It also could be formed of any electrically conductive transparent coating over a transparent substrate for the purpose of this invention.

The entire injecting electrode cylinder is mounted on an end cap 61 which is formed on a hollow shaft 62. The shaft is rotatably driven by a motor M-1 through a bearing 63 in the rear machine frame 64. The opposite end of the injecting electrode housing 65 is held in a sleeve 66 formed in the aperture in the front machine frame 67. Between the housing 65 and the sleeve 66 is a bearing 68 so that the housing may freely rotate within the sleeve.

When the injecting electrode cylinder rotates, the mirror 30 remains stationary in its housing 69 which is formed with a shaft extension 70 passing internally through the hollow drive shaft 62 at the bearings 71 and 72. Because the housing 69 and the housing shaft 70 are only in bearing contact with the rotating injecting electrode mechanism, the mirror is unaffected by the rotation of the hollow shaft 62 and the injecting electrode assembly 1. The housing of the injecting electrode between the end cap 61 and end housing 65 has cross braces such as the brace 73 connecting the two ends and forming a rigid support member. The cross braces are aligned with the no-image areas of the injecting electrode so that they do not interfere with the continuous constant rotational velocity of the injecting electrode during the machine cycle.

The optical object may be a film strip transparency 75 held within a projector 76 that moves a film strip of which the object is a part in synchronized movement with the rotation of the periphery of the injecting electrode cylinder 1. Since the injecting electrode cylinder is transparent, the light rays emanating from the projected object being reflected from the mirror 30 pass through the injecting electrode cylinder to the outer surface interface with the electrode sectors at the imaging area.

A potential is applied to the imaging electrode 20 through the electrical connector strip 43a coupling it to the electrical source 31 by the brush contact 43. The electrical connector strip 44a couples an electrical potential of the opposite sign to that of the imaging electrodes to the transfer electrode 45. The electrical sources are coupled when the electrode sectors pass through the imaging area.

The electrode sector housing 33 is mounted on a shaft 80 which rotates through the machine frames 64 and 67 at bearings 81 and 82 respectively for supplying motion to the electrode sectors for passing generally in rolling contact with the injecting electrode 1 at the imaging area position. The sector housing 33 is keyed by keys 84 and 85 to the shaft 80 to maintain the sectors in a predetermined locked position relative to the shaft 80 and to the injecting electrode 1.

FIG. 3 is an alternative embodiment to that illustrated in FIG. 1. Like reference numerals indicate like parts in the drawings. The main difference in the machine illustrated in FIG. 3 from that in FIG. 1 is that the injecting electrode cleaning station is incorporated in the sectored housing 33 and operates at the imaging area of the machine rather than being at a separate position as Station A in FIG. 1. The injecting electrode cleaning sector 90 has a surface length at least equal to that portion of the circumference of the injecting electrode 1 which is capable of forming an image. This ensures that the entire image forming surface of the injecting electrode is cleaned by action of the image cleaning sector 90.

When the sector 90 passes in interface with the surface 3 of the injecting electrode 1 as do the other electrode sectors, an image is projected to the interface and an electrical field is simultaneously supplied thereto. The electrical field is of the same charge polarity as was the field on the transfer electrode 45 so that any remaining particles which would have a net negative charge on the injecting electrode are removed by the positively charged cleaning sector 90. A connector strip 91 contacts the brush contact 44 to provide the proper field conditions. Prior to interfacing at the image area, the sector is wetted with carrier fluid from the carrier applicator 37 by activating the pump P–1 to draw carrier fluid from the container C–1. The carrier fluid helps to loosen the particles adhering to the surface of the injecting electrode to aid in their migration toward the positively charged cleaning electrode.

While this invention has been described with reference to the structures disclosed herein and while certain theories have been expressed, it is not confined to the details set forth; and this application is intended to cover such modifications or changes or may come within the purposes of the improvements and scope of the following claims.

What I claim is:

1. Apparatus for forming images including
   a hollow transparent member rotatable about an axis,
   a first sector movable to interface with the outer surface of the transparent member at a predetermined position in the path of rotation thereof,
   a second sector movable to interface with the outer surface of the transparent member at the predetermined position,
   a third sector movable to interface with the outer surface of the transparent member at the predetermined position,
   a projection means for presenting registered electromagnetic radiation images at the predetermined position through the hollow transparent member during interface with more than any of the sectors,
   means to couple at least one of said sectors to an electrical source capable of providing a field at the predetermined position during interface with the transparent member.

2. The apparatus of claim 1 including means to move the first, second and third sectors through the same path for interfacing with the transparent member.

3. The apparatus of claim 1 wherein said first, second, and third sectors include portions of a cylinder.

4. The apparatus of claim 3 wherein the sectors are the same shape and size.

5. The apparatus of claim 3 including a housing for mounting said sectors for sequential rotation past the predetermined position.

6. The apparatus of claim 1 including means to clean the outer surface of the transparent member.

7. The apparatus of claim 6 wherein said means to clean includes a fourth sector movable to interface with the outer surface of the transparent member at the predetermined position.

8. The apparatus of claim 7 including coupling said means to clean to an electrical source for providing a field at the predetermined position opposite in polarity to the field between the first sector and the transparent member at the predetermined position.

9. The apparatus of claim 1 including means to supply support material to the third sector such that the material is between the electrode and the transparent member at the interface thereof at the predetermined position.

10. The apparatus of claim 9 including means to maintain the support material on the third sector.

11. The apparatus of claim 10 including means to remove the support material from the third sector after interfacing thereof with the transparent member at the predetermined position.

12. The apparatus of claim 1 including means to apply photoelectrophoretic suspension to one of the members and the first sector prior to the interfacing thereof at the predetermined position.

13. Apparatus for forming an image including:
    a multisectored cylinder adapted for rotation about an axis;
    a hollow transparent member rotatable about an axis positioning said member for interfacing with the sectors of said multisectored cylinder;
    means to couple the sectors to an electrical source;
    means to project electromagnetic radiation images through the member to the interface between the sectors and the member;
    means to supply visible image forming material to the interface between the member and at least one of the sectors.

14. The apparatus of claim 13 wherein said means to couple the sectors to an electrical source includes means to couple at least one of the sectors to an electrical source having a polarity opposite from the outer sectors.

15. The apparatus of claim 13 wherein the sectors are electrically insulated from each other.